(12) United States Patent
Palacharla et al.

(10) Patent No.: US 7,421,197 B2
(45) Date of Patent: Sep. 2, 2008

(54) OPTICAL NETWORK PROTECTION SWITCHING ARCHITECTURE

(75) Inventors: Paparao Palacharla, Richardson, TX (US); Kumar Vijay Peddanarappagari, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 955 days.

(21) Appl. No.: 10/349,140

(22) Filed: Jan. 21, 2003

(65) Prior Publication Data

US 2004/0141741 A1 Jul. 22, 2004

(51) Int. Cl.
*H04B 10/00* (2006.01)

(52) U.S. Cl. .............................................. 398/5; 398/7

(58) Field of Classification Search ..................... 398/1, 398/2, 4, 5, 7, 47, 3, 59, 6, 8
See application file for complete search history.

(56) References Cited

U.S. PATENT DOCUMENTS

| | | | | |
|---|---|---|---|---|
| 4,704,713 | A | 11/1987 | Haller et al. ................. 370/3 |
| 5,442,623 | A | 8/1995 | Wu ........................... 370/16.1 |
| 5,647,035 | A | 7/1997 | Cadeddu et al. ............. 385/24 |
| 5,717,796 | A | 2/1998 | Clendening .................. 385/24 |
| 5,903,370 | A * | 5/1999 | Johnson ......................... 398/4 |
| 5,986,783 | A | 11/1999 | Sharma et al. .............. 359/119 |
| 6,023,359 | A | 2/2000 | Asahi ......................... 359/119 |
| 6,046,832 | A | 4/2000 | Fishman ..................... 359/119 |
| 6,046,833 | A | 4/2000 | Sharma et al. .............. 359/119 |
| 6,052,210 | A | 4/2000 | Nathan ........................ 359/119 |
| 6,088,141 | A | 7/2000 | Merli et al. .................. 359/110 |
| 6,163,527 | A | 12/2000 | Ester et al. ................... 370/228 |
| 6,222,653 | B1 | 4/2001 | Asahi ........................... 359/110 |
| 6,236,640 | B1 * | 5/2001 | Klink ........................... 370/224 |
| 6,262,820 | B1 | 7/2001 | Al-Salameh ................ 359/119 |
| 6,275,312 | B1 | 8/2001 | Derks et al. ................. 359/117 |
| 6,304,347 | B1 | 10/2001 | Beine et al. ................. 359/110 |
| 6,307,986 | B1 | 10/2001 | Duerksen et al. ............. 385/24 |
| 6,321,004 | B1 | 11/2001 | Duerksen et al. ............. 385/24 |

(Continued)

FOREIGN PATENT DOCUMENTS

DE 199 46 487 A1 5/2001

(Continued)

OTHER PUBLICATIONS

PCT International Search Report in International Application No. PCT/US2004/001695, dated Jun. 4, 2004, 7 pages.

*Primary Examiner*—Christina Y. Leung
(74) *Attorney, Agent, or Firm*—Baker Botts L.L.P.

(57) ABSTRACT

A method for protection switching includes receiving an optical signal from a transponder coupled to a client and optically splitting the signal to a first output and a second output. The first output is coupled by a first optical add-drop multiplexer to a first optical fiber, and the second output is coupled by a second add-drop multiplexer to a second fiber. The method further includes selecting one of the output signals for the working channel, and communicating the selected output signal to an optical network. During communication of the selected output signal to the optical network, the method includes monitoring for a failure condition in the optical network and, if the failure condition is detected, selecting the other output signal as the working channel and communicating the new selected output signal.

7 Claims, 3 Drawing Sheets

U.S. PATENT DOCUMENTS

| | | | |
|---|---|---|---|
| 6,331,906 B1 | 12/2001 | Sharma et al. | 359/119 |
| 6,348,985 B1 | 2/2002 | Jiang et al. | 359/127 |
| 6,400,476 B1 * | 6/2002 | Arecco | 398/9 |
| 6,438,286 B1 * | 8/2002 | Duerksen et al. | 385/24 |
| 6,639,703 B1 * | 10/2003 | Egnell | 398/175 |
| 6,898,376 B1 * | 5/2005 | Gerstel et al. | 398/5 |
| 6,973,267 B1 * | 12/2005 | Arecco et al. | 398/4 |
| 2001/0017722 A1 | 8/2001 | Takachio et al. | 359/124 |
| 2001/0017866 A1 | 8/2001 | Takada et al. | 370/535 |
| 2001/0026384 A1 | 10/2001 | Sakana et al. | 359/124 |
| 2001/0040710 A1 | 11/2001 | Sharratt et al. | 359/119 |
| 2001/0040711 A1 | 11/2001 | Al-Salameh et al. | 359/128 |
| 2002/0003639 A1 | 1/2002 | Arecco et al. | 359/119 |
| 2002/0018269 A1 | 2/2002 | Chaudhuri et al. | 359/165 |
| 2002/0071148 A1 * | 6/2002 | Purse et al. | 359/110 |
| 2003/0169470 A1 * | 9/2003 | Alagar et al. | 359/110 |
| 2003/0180047 A1 * | 9/2003 | Way et al. | 398/59 |
| 2004/0208578 A1 * | 10/2004 | Kinoshita et al. | 398/83 |

FOREIGN PATENT DOCUMENTS

| | | |
|---|---|---|
| WO | WO 01/45311 A1 | 6/2001 |
| WO | WO 01/45451 A1 | 6/2001 |
| WO | WO 01/45451 A1 * | 6/2001 |
| WO | WO 02/17533 A2 | 2/2002 |
| WO | WO 02/17533 A2 * | 2/2002 |

* cited by examiner

# OPTICAL NETWORK PROTECTION SWITCHING ARCHITECTURE

TECHNICAL FIELD OF THE INVENTION

This invention relates generally to optical networks and more particularly to techniques for optical protection switching using client transponders.

BACKGROUND OF THE INVENTION

Protection switching is an important feature of many optical ring networks. Protection switching can provide methods for delivering information in case of failures at network nodes, optical fibers, or other components of the optical network. Increased efficiency and functionality of protection switching hardware may considerably reduce loss of information and other associated costs of network failure. As a result of these benefits, improvements in protection switching are extremely useful for optical networks.

SUMMARY OF THE INVENTION

The present invention relates techniques for optical protection switching using client transponders. Certain embodiments of the present invention provide improved protection switching in cases of network failure. In addition, certain embodiments provide client protection in the event of client failure.

In one embodiment, a method for protection switching includes receiving an optical signal from a transponder coupled to a client and optically splitting the signal to a first output and a second output. The first output is coupled by a first optical add-drop multiplexer to a first optical fiber, and the second output is coupled by a second add-drop multiplexer to a second fiber. The method further includes selecting one of the output signals for the working channel, and communicating the selected output signal to an optical network. During communication of the selected output signal to the optical network, the method includes monitoring for a failure condition in the optical network and, if the failure condition is detected, selecting the other output signal as the working channel and communicating the new selected output signal.

In another embodiment, a system includes a client for an optical network, first and second transponders, and protection switching hardware that includes an optical selector. Each transponder receives an electrical signal from the client and converts the electrical signal into an optical signal. The protection switching hardware receives the optical signals from the transponders and selects an output signal from the optical signal of the first transponder and the optical signal of the second transponder. The protection switching hardware then communicates the selected output signal of the optical selector to an optical network.

Embodiments of the present invention provide a number of technical advantages. For example, certain embodiments use transponder resources more efficiently. With proper design of the switching architecture, the working path and protection path may share a single transponder, rather than having a separate transponder for each path. This reduces the expense involved in constructing the network as well as reducing the number of components subject to failure.

Certain embodiments use client protection transponders include an additional transponder in the network for client protection. In the event of a failure in the working transponder, the switching architecture allows the client protection transponder to take over for the working transponder without necessitating replacement of the working transponder.

Client protection transponders may also carry additional low priority traffic. Rather than simply serving as a backup to the working transponder, the client protection transponder may communicate additional information to nodes of the network using the network protection path. In the event of network failure, the low priority traffic may be replaced with higher priority traffic.

Yet another advantage of certain embodiments of the present invention is easier access to and replacement of transponders. Transponders may be placed on the client side of the protection switching hardware rather than on the network side. Because clients are often more easily accessible than components in close proximity to network fibers, transponder failures may be corrected with relative ease. Furthermore, in embodiments that also use client protection transponders, the network's operation need not be interrupted by the replacement process.

Still another technical advantage of certain embodiments of the present invention is easier reconfiguration of the optical network. As noted before, client-side transponders are typically more accessible by technicians than transponders on the network side of protection switching hardware. Someone wishing to reconfigure the network can use the access to the transponder to reconfigure the network with relatively little difficulty. For example, a technician might access a patch panel of the transponder that receives signals from the client using cables plugged into the patch panel. To reconfigure the signal path, the technical may adjust the cable arrangement so that signals are redirected to other paths in the network. In particular architectures, this allows the technician to change the protection path of the ring between shared protection and dedicated protection or to reconfigure the network to communicate low priority traffic on the protection path with relative ease.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying figures, in which.

DETAILED DESCRIPTION OF THE INVENTION

Figure 1:
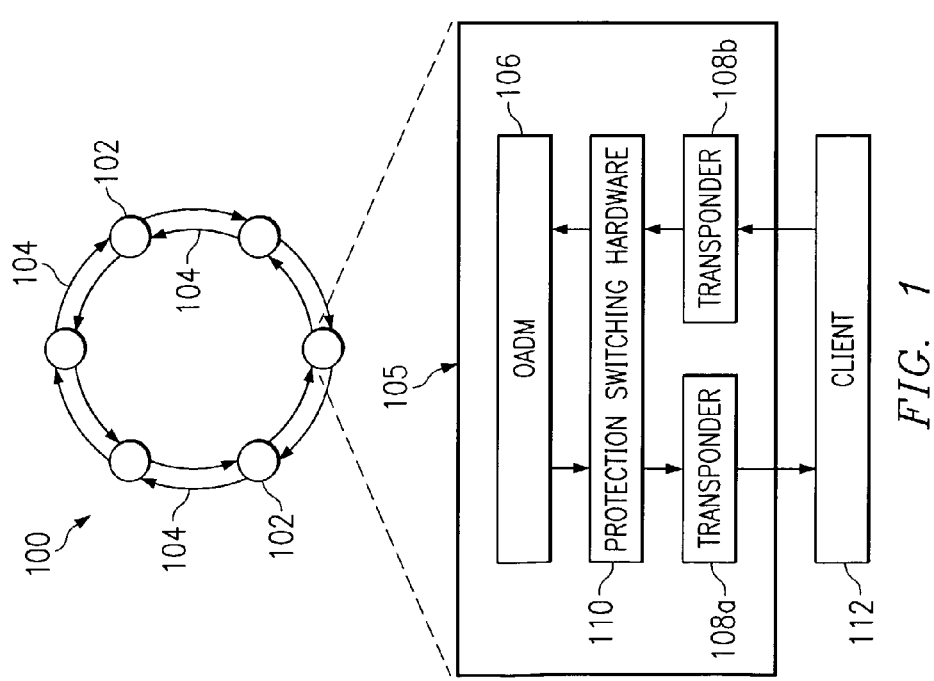
FIG. 1 depicts an optical network with nodes that include client transponders.

FIG. 1 illustrates an optical network 100 that includes nodes 102 connected by optical links 104. Network 100 uses client-side transponders to provide optical protection switching. The client-side transponders are typically more accessible than transponders on the network side of the protection switching hardware, which typically allows technicians to access the transponders for tasks such as reconfiguration and replacement more easily. Additional client-side transponders may provide client protection in case of transponder failure and may also communicate low priority traffic using alternate paths through network 100.

Network 100 is illustrated as an optical ring network 100 that allows nodes to exchange information in any suitable format, including synchronous optical network (SONET) frames, asynchronous transfer mode (ATM) cells, frame relay, Internet protocol (IP) packets, or any other suitable packet, frame, cell, segment or portion of information (collectively referred to as "packets"). While illustrated as a ring network 100, network 100 may be arranged in multiple rings, as well as linear, mesh, star, or any other suitable network architecture. Nodes 102 include any hardware and/or software used to exchange information in the form of optical signals with other devices, such as other nodes 102. Nodes 102 may perform any suitable conversion, switching, adding or dropping of signals, including converting signals between optical and electrical form. Optical links 104 represent any medium, such as optical fiber, that communicates optical signals between nodes 102, and may include any necessary converters, repeaters, electrical or optical amplifiers, or other suitable component for supporting communication of optical signals between nodes 102. Network 100 is depicted as a two-fiber network that includes a westbound fiber 104a and an eastbound fiber 104b, but it should be understood that network 104 may also include additional fibers 104 as well.

Network 100 may use any suitable provisioning or protection path. For example, network 100 may be a unidirectional path switched ring (UPSR). In UPSR, node 102 originates a signal by communicating the signal around the ring in both directions. A node 102 receiving the duplicate signals determines which of the signals has the highest quality and takes that as the "true" signal, but in case of failure, node 102 can operate using the remaining optical signal. Between the working signal and the protection signal, at least one copy of the signal traverses every link 104 of the ring, so that once a particular channel is provisioned, it must be provisioned around the entire ring.

In an alternative embodiment, network 100 may be a shared protection ring (SPR) in which the wavelengths of the optical signal between nodes are apportioned between working channels and protection channels, often in alternating sequence. Information is communicated between nodes 102 along a path in one direction, but if a particular link 104 between the nodes 102 fails, the information may be communicated in the opposite direction along a protection path. Because the protection path need not be active until a link 104 fails, a particular wavelength does not need to be provisioned all the way around the ring just because it is provisioned at one node. According to particular embodiments, protection channels and working channels are assigned to alternating wavelengths, such as protection assigned to odd-numbered channels and working assigned to even-numbered channels. In the opposite direction, channels may be assigned to the opposite alternating wavelengths, allowing bidirectional communication.

Box 105 illustrates selected components in one example of node 102. The depicted components of node 102 include an optical add-drop multiplexer (OADM) 106, transponders 108, a client 112, and protection switching hardware 110. OADM 106 represents any combination of hardware and/or software that can add or drop optical signals from one of the fibers 104. OADM 104 extracts optical signals from a particular fiber 104 for communication to client 112 and receives signals from client 112 for communication to fiber 104. OADM 104 may add and drop signals on any, all, or none of the wavelengths carried by fiber 104.

Transponders 108a and 108b (collectively referred to as "transponders 108") convert optical signals into electrical signals usable by client 112. Transponders 108 may include any suitable combination of optical, electronic, and mechanical hardware, including appropriate software, suitable for signal conversion. In the depicted embodiment, transponder 108a is an optical-electrical-optical (OEO) receive transponder ("RxT") 108a that receives optical signals from OADM 106, converts them to electrical form for processing, and reconverts the signals to optical form for communication to client 112. Transponder 108a is an OEO transmit transponder ("TxT") 108b that receives electrical signals from client 112, converts them into optical signals, and communicates them to OADM 106. Particular embodiments may contemplate different functionality and structure for transponders 108. For example, transponders 108 may be optical-electrical transponders 108 that convert optical signals into electrical signals that are processed by client 112. The functions of transponders 108 may also be incorporated into clients 112, so that client 112 functions as both client 112 and transponder 108.

Protection switching hardware ("PSH") 110 includes any collection of electrical, optical or mechanical components and any suitable software to allow optical signals to be switched between a working path and a protection path. PSH 110 may include optical switches, selectors, splitters, mirrors, lenses, amplifiers, motors, relays, programmable devices, memory, or any other suitable components. Generally, PSH 110 is also connected to an additional OADM that sends and receives optical signals from a fiber 104 communicating signals in the opposite direction from the fiber 104 connected to the depicted OADM 106.

In operation, client 112 exchanges information with various nodes 102 using a provisioned communication path. Client 112 communicates information in the form of optical signals to TxT 108b, which communicates them to network 100 via OADM 106. Client 112 similarly receives optical signals dropped by OADM 106 from RxT 108a. When a failure is detected in a link 104 or an intermediate node 102 along the working path, PSH 104 switches traffic to and from client 112 along an alternate protection path.

In particular embodiments, transponders 108 are placed in proximity to client 112 so as to be accessible by technicians without having to disturb other optical hardware, such as PSH 110 or OADM 106. This allows relatively quick and easy replacement and reconfiguration of transponders 108 in case of failure. In one example of such an embodiment, transponders 108 include patch panels that receive signals from client 112 using cables plugged into the patch panel. One advantage of such embodiments is that a technician with access to the panel may manually reprovision network connections so that the optical signal is directed along a different path by PSH 110. Thus, in an SPR network 100, the technician might rearrange the cables from client 112 so that the protection path rather than the working path becomes the default path. Alternatively, an SPR network 100 may be converted to a UPSR by suitable rearrangement of cables in the patch panel. Particular embodiments may employ automatic reconfiguration systems, such as multiport hubs, in order to further facilitate reconfiguration. In such embodiments, using client-side transponders may facilitate the placement of such automated systems by providing easier access to the relevant components.

Figure 2:
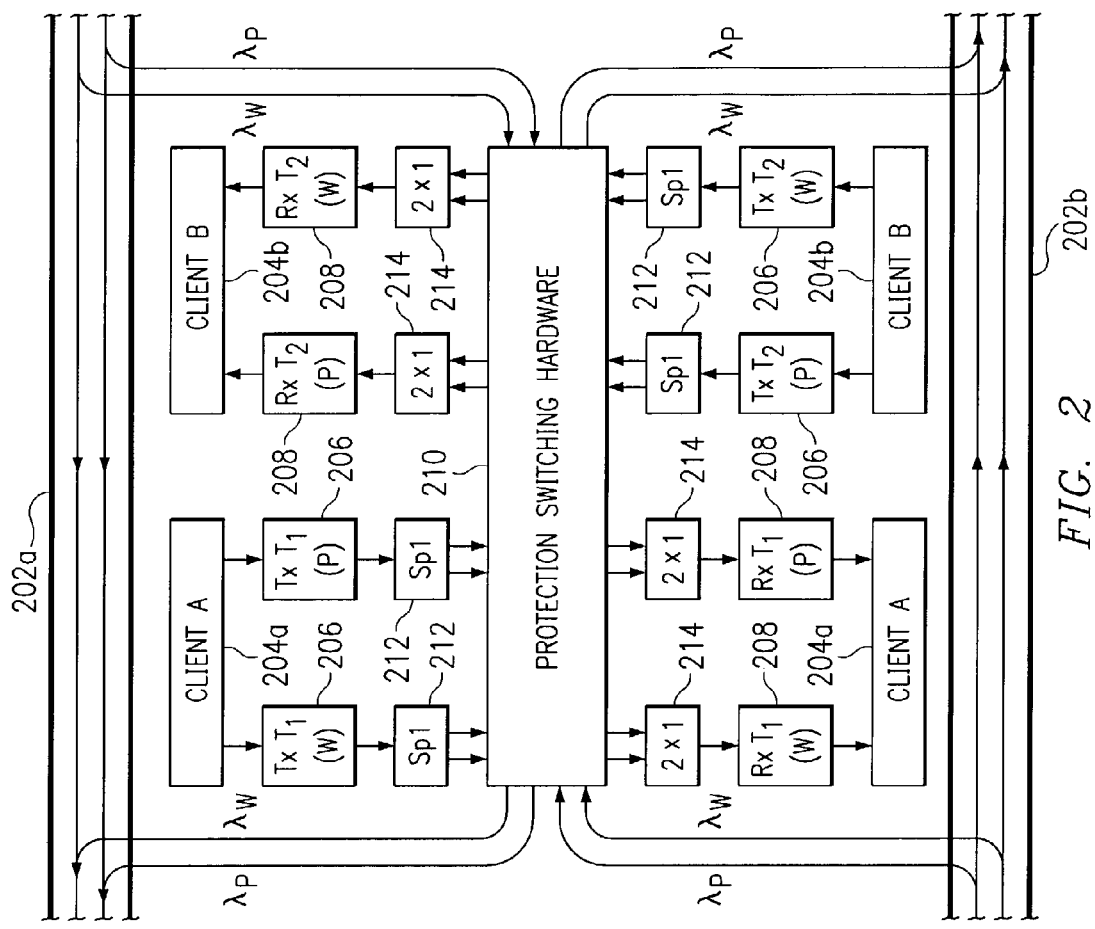
FIG. 2 depicts in greater detail a node in the optical network.

FIG. 2 shows a particular example of an optical node 200 for use in system 100. Node 200 includes an OADM 202a for a westbound fiber, and OADM 202b for an eastbound fiber, clients 204a and 204b (collectively referred to as "clients 204"), and TxTs 206 and RxTs 208 for each client 204. Optical switching hardware in node 200 includes PSH 210, optical splitter 212, and 2×1 optical selectors 214. Splitters 212 and selectors 214 represent any suitable component for performing splitting or selection of optical signal respectively, and may include prisms, mirrors, lenses, attenuators, relays, motors, programmable devices or any other suitable optical, electrical, or mechanical component. In the embodiment illustrated, splitters 212 divide one signal into two signals, while selectors 214 select one signal from two input signals.

Splitters 212 split the optical signal from TxTs 206 into the working path of PSH 110 and the protection path of PSH 110. In a UPSR network 100, both paths are active for provisioned paths unless there is a failure somewhere in network 100. In an SPR network 100, the protection path need not be active unless there is a failure, so the split signal along the protection path may be attenuated or otherwise blocked from communication to network 100.

Selectors 214 select between receiving a signal from the working path and receiving a signal from the protection path. In a UPSR network 100, selectors 214 may include light intensity detectors, analyzers, or other tools for selecting the higher quality signal between the nominal working and protection paths. In an SPR network 100, selectors 214 may be adjusted to select the optical signal from the particular path that is currently active. For example, if protection mode has been triggered, selector 214 accepts the optical signal from the protection path and blocks the optical signal from the working path.

The depicted node 200 includes not only working TxTs 206 and RxTs 208 (indicated by the letter "W") but also TxTs 206 and RxTs 208 used for client protection (indicated by the letter "P"). For example, client A 204a has working TxT$_1$ 206 and RxT$_1$ 208 as well as protection TxT$_1$ 206 and protection RxT$_1$ 208. Protection TxT$_1$ 206 and protection RxT$_1$ 208 are fully functional transponders connected to clients 204 and PSH 210 such that when the working transponder 206 fails, the protection transponder 206 provides a backup. In particular embodiments of node 200, splitter 212 continuously provides a signal from both protection and working transponders 206/208, and either PSH 210 or selectors 214 are used to filter out the duplicate signal. One advantage of certain embodiments of node 200 is that protection TxTs 206 may be used for communication of traffic even while the corresponding working TxT 206 is operating. In that case, protection TxT 206 sends additional information along the protection path, while working TxT 206 communicates information along the working path. In cases of failure that require the use of protection TxT 206 or the protection path, TxT 206 must discard the additional traffic to allow the main working traffic to be communicated along the protection path. Thus, any additional traffic communicated by protection TxT 206 should be lower priority than the main traffic so that it can be discarded in favor of the main traffic.

In operation, clients 204 and/or PSH 210 monitor for indications of signal failure. If a failure occurs, the appropriate component determines whether the failure is a network failure, such as a failure in a link 104 or an intervening node 102 along the working path, or a transponder failure that interferes with the ability of one of clients 204 to exchange information with its associated OADM 202. In the case of a network failure, PSH 210 switches the optical signal from the working path to the protection path. In case of a transponder failure, PSH 210 adjusts components of node 200 such that client 204 receives and/or transmits its signals using the appropriate protection transponder 206/208.

Figure 3:
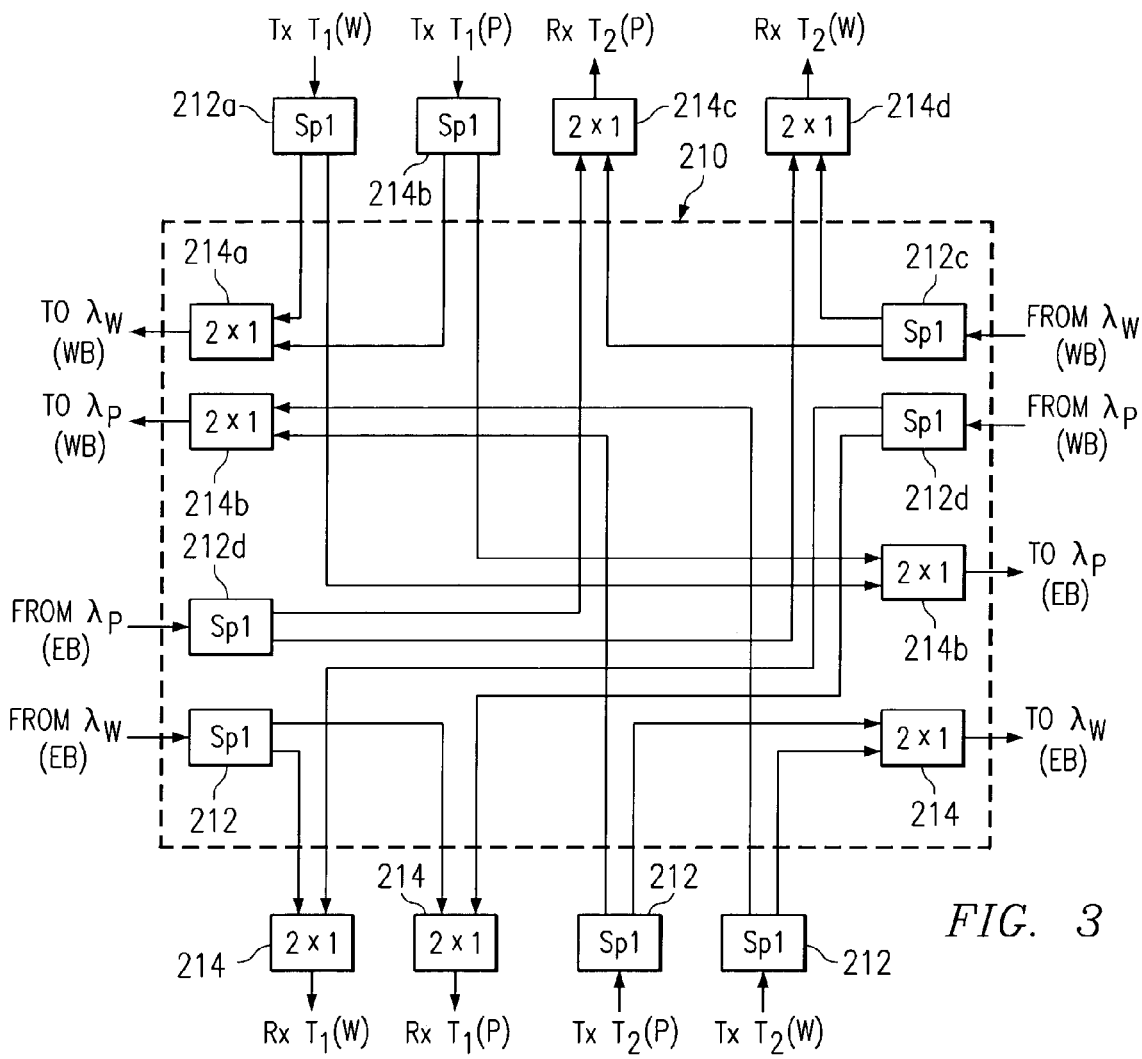
FIG. 3 depicts an example of protection switching hardware in the node.

FIG. 3 illustrates PSH 210 in greater detail. PSH 210 includes an array of splitters 212 and selectors 214. PSH 210 exchanges optical signals with both the westbound and the eastbound OADMs 202 so that signals may be sent and received from the ring in the opposite direction when the protection path is triggered. Wavelengths may be assigned to the working and protections paths according to any suitable scheme, such as assigning even-numbered channels to the working channel in one direction and odd-numbered channels to the working path in the other direction. To facilitate identification of particular components of PSH 210, certain splitters 212 and selectors 214 have been identified as 212a, b, c, and d, and 214a, b, c, and d.

With respect to transmitting signals to network 100, the operation of PSH 210 may be illustrated as follows. Splitters 212a and 212b duplicate the signals of the working and protection TxTs, respectively, associated with client A. Splitter 212a splits the signal from the working TxT 206 between one selector 214a coupled to the working path and another selector 214b coupled to the protection path. Splitter 212b splits the signal from the protection TxT 206 between selector 214a and selector 214b as well. Selector 214a may then select between the working and protection TxTs 206, so that if the signal from the working TxT 206 fails, selector 214a may use a signal from the protection TxT 206 instead. Similarly, selector 214b may select between the signal from the working TxT 206 or the protection TxT 206. However, in SPR networks 100, the protection path may be unused. In that case, selector 214b may accept a low priority traffic signal from the protection TxT 206.

PSH 210 may optically select between the working and protection paths as follows. Splitter 212c receives the working signal from OADM 202a and splits the signal to selector 214c coupled to protection RxT 208 and selector 214d coupled to working RxT 208. Splitter 212d similarly splits the protection signal to selectors 214c and 214d. Thus, both selector 214c and selector 214d may select from either the working or the protection path, so either one of the selectors 214c or 214d may provide the proper signal to its respective RxT 208. Consequently, if the working RxT 208 fails, the protection RxT 208 may step into place for the working RxT 208 immediately.

FIGS. 1, 2, and 3 have illustrated particular embodiments of protection switching in an optical node 102, but these are by no means the only possibilities. The techniques described are adaptable to any optical ring network, as well as linear, mesh, star, multiple conjoined rings, or any other suitable network architecture, without changing the basic operation of the protection switching described. Furthermore, the described embodiments include various options, such as client protection transponders 206/208, that provide additional advantages, but it should be understood that the protection switching hardware described may be applied to more or less complicated networks 100 as well. As noted, the techniques may be applied to both UPSR and SPR networks 100 without changing the operation of the protection switching hardware described. These and other variations that may be apparent to one skilled in the art do not represent substantial departures from the particular embodiments described.

Figure 4A:
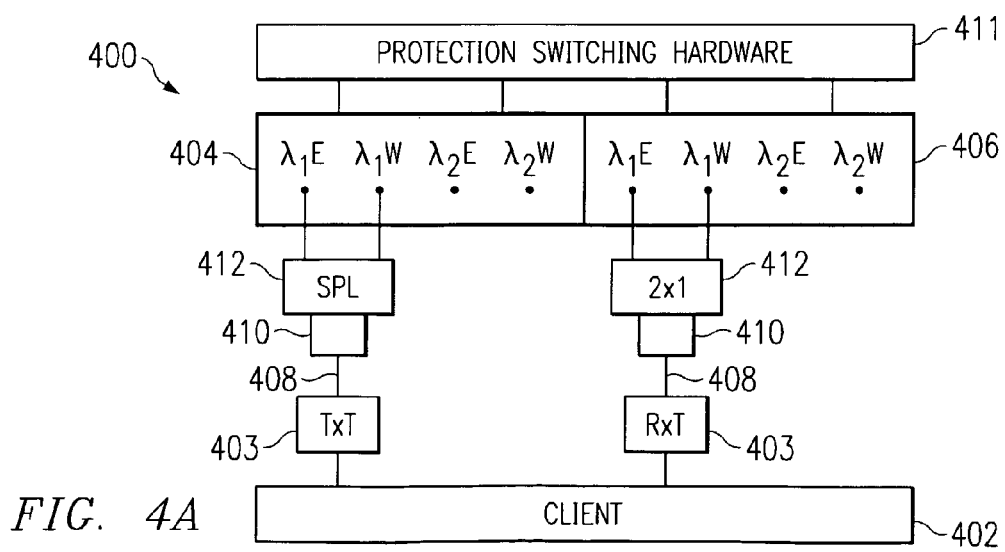
FIGS. 4A and 4B show an example of a patch panel used to configure client transponders.
Figure 4B:
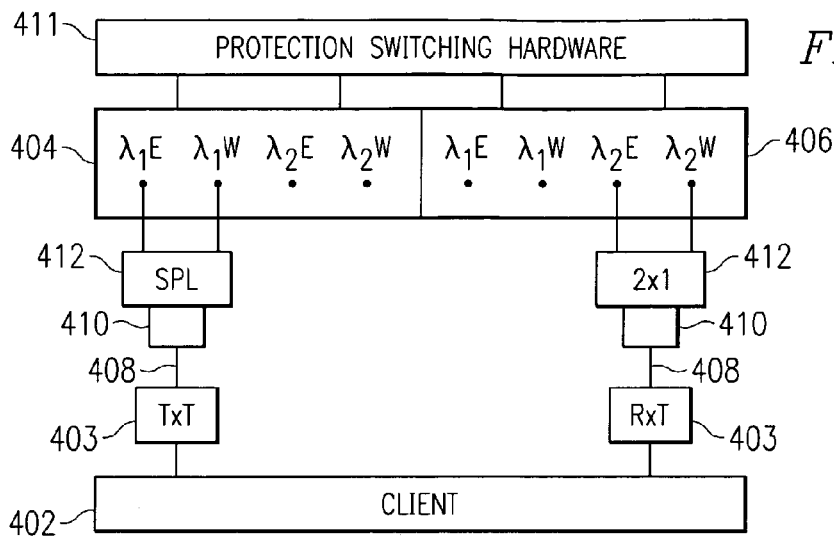

FIGS. 4A and 4B illustrate an example of a patch panel 400 that allows a client 402 coupled to transponders 403 to connect to transmitting path 404 and receiving path 406 by plugging cables 408 into inlets 410 of patch panel 400. Protection switching hardware 411 determines the channels communicated to transmitting path 404 and receiving path 406. Cables 408 represent any suitable medium for carrying electrical signals, including twisted pair, coaxial cable, insulated wire, or any other conductive material. Inlets 410 represent connections to splitter 412 and 2×1 selector 414, each of which has outputs and inputs (respectively) that correspond to a particular wavelength of optical signal received from either the westbound fiber 104 or the eastbound fiber 104. Although patch panel 400 has been illustrated with only two wavelengths, it should be understood that an ordinary optical network may have many more wavelengths accessible. Cables 408 may couple to inlets 410 by plugging them in, screwing them on, or by any other suitable method of connection.

In a UPSR network 100, a particular wavelength is provisioned all the way around the ring, and the same wavelength is used for the protection path as for the working path. Consequently, client 402 sends and receives the same wavelength from paths 404/406. This is reflected in FIG. 4A, which shows client 402 receiving and transmitting information on the same wavelengths.

By contrast, in an SPR network 100, the wavelength sent need not correspond to the wavelength received, since information may be added and dropped at intervening nodes, and the reservation of wavelength allows bi-directional traffic. Hence, the send and receive wavelengths may vary according to a predetermined scheme for assigning working and protection wavelengths. This is illustrated in FIG. 4B, which shows client 402 using alternating wavelengths for receiving and transmitting information.

When reconfiguration of the network is required, a technician may perform suitable reconfiguration by disconnecting and reconnecting the cables. Obviously, with the greater number of wavelengths, the reconfiguration process will be considerably more complicated than the transition illustrated between FIGS. 4A and 4B. Despite that complexity, however, the reconfiguration process is considerably less complicated than that required to reconfigure an optical network in which the transponders are located in close proximity to the OADMs 202 in network 100. Furthermore, automated reconfiguration systems may facilitate reconfiguration of the transponders, in place of or in addition to the patch panel. If a component fails, the position of patch panel 400 facilitates access to components.

Figure 5:
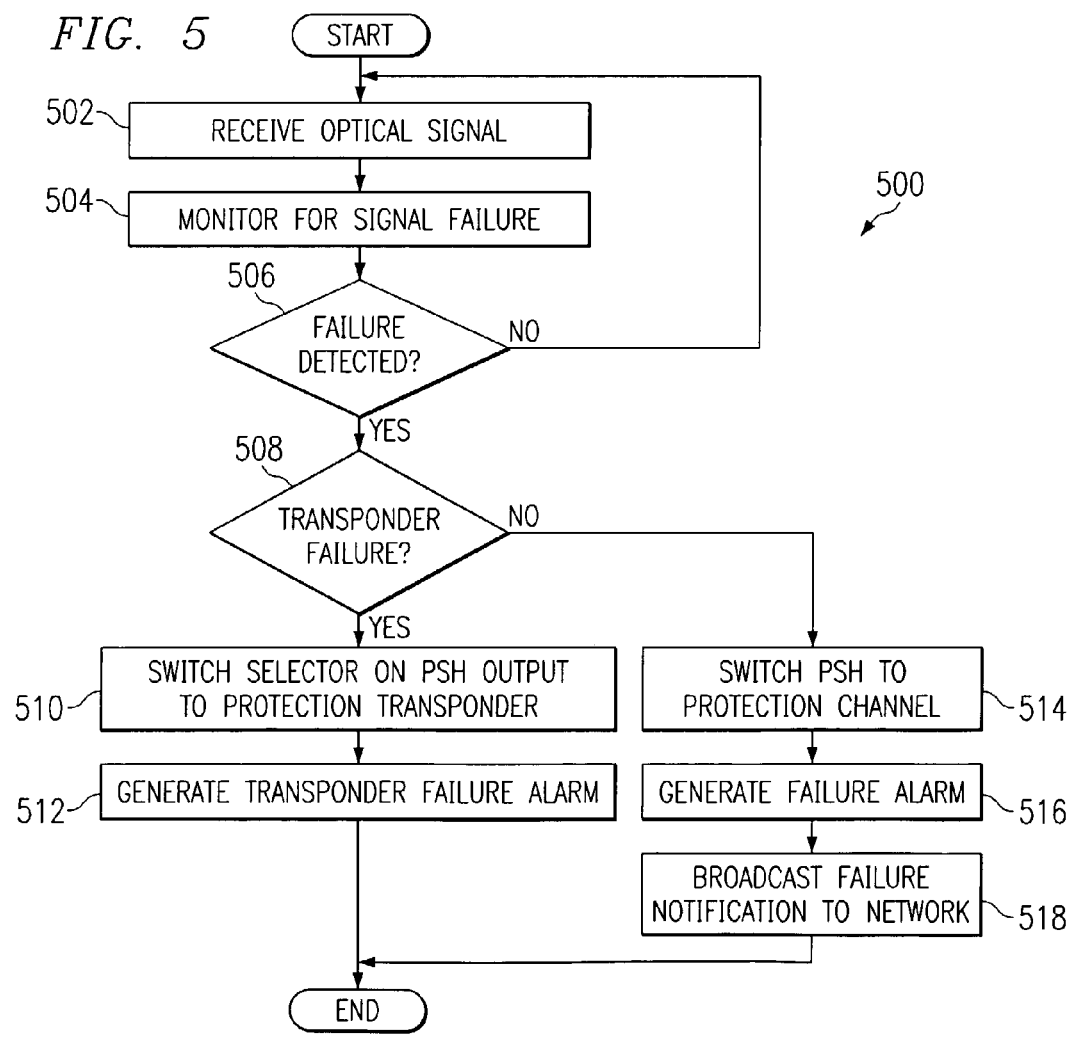
FIG. 5 is a flow chart illustrating an example of a method for protection switching.

FIG. 5 is a flow chart 500 illustrating one example of a method for protection switching including both network and client protections. PSH 210 receives an optical signal from TxT 206 at step 502. PSH 210 monitors for a failure in the optical signal received from or transmitted to client 204 at step 504. If no failure is detected at decision step 506, PSH 210 continues to monitor for signal failure at step 502. If a failure is detected at step 506, PSH takes remedial action.

PSH 210 determines whether the failure is in the TxT 206 or in network 100 based on whether the failed signal was sent or received from client 204 at step 508. If the failure is in TxT 206, PSH 210 switches selector 214 on PSH 210 output to select the input from protection TxT 206 at step 510. PSH 210 then generates a transponder failure alarm at step 512.

If the failure is a network failure rather than a transponder failure, PSH 210 switches its components so that the signal is routed on the protection channel at step 514. PSH 210 generates a failure alarm indicating that it has detected a failure at step 516. At step 518, PSH 210 may then broadcast to the network a notification that a network failure has been detected in order to facilitate rapid identification and isolation of fault conditions.

The described method is only one of numerous possible methods for protection switching using client transponders. Various steps may be consolidated, rearranged, added, or removed without changing the overall operation of the method. Furthermore, steps may be performed by various components of network 100 and may even be centrally controlled. Consequently, the method presented is by no means exclusive of other variations apparent to one skilled in the art.

Although particular embodiments of the present invention have been described in detail, numerous modifications, variations, and transformations will be apparent to one skilled in the art. It is intended, therefore, that the present invention encompass all such changes, variations, alterations, transformations, and modifications as fall within the scope of the appended claims.

What is claimed is:

1. A method for protection switching in an optical network, comprising:

providing a node in an optical network comprising a first transponder and a second transponder coupled to a client;

receiving a first optical signal from the first transponder;

communicating the first optical signal over a working path on a first fiber in a first direction using an add-drop multiplexer;

monitoring for a failure in the first optical signal;

if a failure in the first optical signal is detected, receiving a second optical signal from the second transponder and communicating the second optical signal to the optical network in place of the first optical signal over the working path in the first direction on the first fiber; and if a failure in the first optical signal is not detected, receiving a third optical signal comprising low-priority traffic from the second transponder, and communicating the third optical signal to the optical network along a protection path on a second fiber in the optical network.

2. The method of claim 1, further comprising:

monitoring for a failure condition in the optical network; and if the failure condition is detected, communicating the first optical signal to the optical network along the protection path.

3. The method of claim 1, further comprising:

detecting a replacement of the first transponder;

receiving the first optical signal from the replaced first transponder; and stopping communication of the second optical signal.

4. A system, comprising:

first and second transponders, each transponder operable to receive an input signal from a client and to communicate the input signal as an optical signal; and protection switching hardware operable to receive a first optical signal from the first transponder and a second optical signal from the second transponder, the protection switching hardware comprising an optical selector operable to select between the first and second optical signals, the protection switching hardware further operable to communicate the selected optical signal over a working path in a first direction on a first fiber of the optical network;

wherein the second transponder is further operable to communicate low priority traffic along a protection path on a second fiber of the optical network.

5. The system of claim 4, wherein:
the first transponder is selected as a working transponder; and
the optical selector selects the optical signal from the second transponder only when the first transponder fails.

6. The system of claim 4, wherein:
each transponder further comprises a patch panel, the patch comprising inputs operable to receive a plurality of input signals, each input signal corresponding to one of a plurality of output wavelengths of the transponder;
the input signals are communicated to the inputs of the patch panel using input cables; and
the correspondence between the input signals and the output wavelengths of the transponder is reconfigurable by coupling the input cables to different inputs of the patch panel.

7. The system of claim 4, wherein the protection switching hardware is further operable to:
monitor for a failure condition in the optical network; and
in response to detecting the failure condition, communicate the selected optical signal along a protection path on a second fiber of the optical network.

* * * * *